(12) United States Patent
Debbouz et al.

(10) Patent No.: US 6,413,565 B2
(45) Date of Patent: Jul. 2, 2002

(54) LOW SHEAR METHOD FOR MAKING PASTA

(75) Inventors: Amar Debbouz; Edward Albert Matuszak, both of Columbus, OH (US)

(73) Assignee: New World Pasta Company, Harrisburg, PA (US)

( * ) Notice: Subject to any disclaimer, the term of this patent is extended or adjusted under 35 U.S.C. 154(b) by 0 days.

(21) Appl. No.: 09/773,731

(22) Filed: Feb. 2, 2001

Related U.S. Application Data

(60) Provisional application No. 60/179,750, filed on Feb. 2, 2000.

(51) Int. Cl.⁷ .............................. A23L 1/00; B29C 47/00
(52) U.S. Cl. ................... 426/516; 425/382 R; 426/451; 426/557
(58) Field of Search ................... 426/496, 451, 426/516, 557; 425/382 R, 461, 463, 464

(56) References Cited

U.S. PATENT DOCUMENTS

| | | | |
|---|---|---|---|
| 5,089,284 A | * | 2/1992 | Irvin et al. ............ 426/516 |
| 5,192,543 A | * | 3/1993 | Irvin et al. ............ 425/464 |
| 5,741,531 A | * | 4/1998 | Kowalski et al. ....... 425/464 |
| 5,789,035 A | * | 8/1998 | Kowalski et al. ....... 426/557 |

\* cited by examiner

*Primary Examiner*—George C. Yeung
(74) *Attorney, Agent, or Firm*—Stevens, Davis, Miller & Mosher, L.L.P.

(57) ABSTRACT

A method and apparatus are provided to produce non-sticky pasta with improved properties, including better surface smoothness and color (yellowness and brightness), with minimal loss of solids during cooking. Improved organoleptic properties, e.g., mouth feel, are also achieved by a process and apparatus which imparts low shear to an alimentary paste processed by an extruder. Components of the extruder, including screens and/or breaker plates, are coated with a low friction material such as polytetrafluoroethylene. One hundred percent of the orifice in the die body are provided with a low friction coating such as polytetrafluoroethylene in the form of an insert and tube which extends from the rear surface of the die to the orifice exit. The rear surface of the die may also be coated with a low friction material such as polytetrafluoroethylene.

20 Claims, 1 Drawing Sheet

LOW SHEAR METHOD FOR MAKING PASTA

This application is a U.S. Non-Provisional Application based on U.S. Provisional Application Ser. No. 60/179,750, filed Feb. 2, 2000, the entire disclosure of which is incorporated herein by reference.

BACKGROUND OF THE INVENTION

1. Field of the Invention

The manufacture of pasta having a smooth surface with minimal amount of solid loss during cooking and with minimal amount of stickiness is accomplished by the use of a low shear extrusion process. Low shear extrusion apparatus to produce a pasta with a smooth surface, minimal amount of solid loss during cooking and minimal amount of stickiness is also provided.

2. Description of the Related Art

Pasta is a nutritional food with a very widespread popularity, independent of economic status or ethnic background. Manufacture of pasta in many different manners by many different entities has made the production of pasta a very crowded art.

One of the methods of manufacturing pasta has been to form an alimentary paste of a flour and water and force such paste through a die which shapes the paste into a desired shape. The pasta obtained from such a process may be further treated, i.e., coated with materials such as an edible oil and/or an edible acid and may, alternatively, be directly cooked or dried. Commercially available dried pasta takes nine to twelve minutes to cook for optimal tenderness. Once cooked, the pasta tends to become sticky and to lose organoleptic properties upon standing for any period of time. Other problems with such commercially available pasta is solid loss during cooking. Extruded products do not necessarily have a smooth surface even though they slide through the die channels (or orifices) during shaping of the alimentary paste because we have found that the paste adheres to the material of which the die is made resulting in shear and surface irregularities in the resulting pasta product.

Current pasta dies available on the market include three components: a die holder made of bronze or bronze aluminum with a predetermined number of holes or passages through which a material is extruded, metallic inserts that will fit inside the holes of the die holder, and metallic rings that will hold the inserts inside the die holes. When placed inside in the holes, the inserts are pushed to the bottom of the die holes and fill approximately one quarter (25%) of the total height of the hole.

A discussion of design and performance of pasta dies was published in Cereal Foods World, pages 807–810, by D. Maldari et al in 1993. Therein, not only bronze alloy, but also stainless steel dies with bronze alloy or TEFLON (trademark of duPont, Wilmington, Del.) inserts were described. It was said that the TEFLON inserts were extensively used for pasta dies.

In the *Journal of Food Science*, Vol. 47, pages 1055–1058, in an article entitled *"TEFLON and Non-TEFLON Lined Dies: Effect on Spaghetti Quality"* by B. J. Donnelly, it was said that TEFLON-lined dies was used for three basic reasons, namely, (a) it extends the life-time of the dies by reducing wear on the brass and/or steel; (b) it provides a smoother surface to the pasta; and (c) it improves the general appearance of the dried product.

It was said by Donnelly that there was no published information available detailing the relative quality merits of pasta processed through both die forms. The purpose of the Donnelly paper was to review some research that was done in the laboratory on the effect on spaghetti color and cooking quality of processing durum wheat semolina through TEFLON and non-TEFLON lined dies. In addition, scanning electron microscopy (SEM) of the dry and cooked spaghetti was utilized to determine what gross structural differences were present and if these could contribute to quality differences. However, the Donnelly publication lacks any teaching regarding the TEFLON liner.

The patent literature also contains disclosure of methods for making extruded pasta shapes by feeding a feed stock comprising a glutinous flour and water to an extruder that is equipped with a die plate having a plurality of holes and extruding the alimentary paste through the holes in the extruder die plate by internal pressure; See, U.S. Pat. No. 5,089,284, to Irvin et al. The improvement provided by the invention of Irvin et al comprises heating the extruded die plate to a temperature of at least 130° F. (about 54° C.) and, preferably, about 160° F. (about 71° C.). In a preferred embodiment, a coating was provided on a portion of the interior of the holes such that heat transfer from the die to the paste is substantially inhibited until the cross section of the hole reached its smallest value. Thus, in the Irvin die, tapered holes were provided in the die and the first portion of the tapered holes extending from the back of the die toward the orifice was provided with a coating material selected from polyvinylidinefluoride and polytetrafluroethylene ("TEFLON" from Dupont, Wilmington, Del.). The innermost face of the die plate is also preferably insulated in order to prevent transfer of heat to the unextruded paste.

The coating on a portion of the orifices served to substantially inhibit heat transfer to the paste being extruded until the small cross section of the hole reaches its smallest value, e.g., by coating all but about the last ten to twenty-five percent of the orifices.

Despite these patents and publications, there remains a need to improve the surface smoothness and organoleptic properties, e.g., mouth-feel, color of pasta products made by an extrusion process.

OBJECTS AND BRIEF SUMMARY OF THE INVENTION

It is an object of the invention to provide pasta products with improved surface smoothness and organoleptic properties by a low shear extrusion process, wherein an alimentary paste comprising flour and water is fed to a screw extruder, which mixes and conveys the paste and pressurizes the paste so as to force the paste through holes of a die.

It is a further objection of the invention to provide an apparatus comprising a barrel, a rotatable screw within the barrel and a die having a plurality of holes at the end of the barrel wherein the holes of the die are 100% lined with a polytetrafluoroethylene (hereinafter "PTFE") material.

It is a further objection of the invention to provide a low shear extrusion process, in which an extrudible mass is sheared by various components of the extrusion apparatus, where such components are completely covered with a low friction materials, such as PTFE, which reduces the shear on the extrudible mass.

It is a still further object of the invention to provide an extrusion apparatus comprising an extruder barrel, a rotatable screw contained within said barrel, a screen and a breaker plate, either or both of which are completely covered with a low friction material such as PTFE and a die having die inserts, which die inserts comprise a low friction material, such as PTFE, preventing any contact of the extrudible mass with the walls of the die and, optionally, comprising covering the back of the die with a coating of low friction material, such as PTFE.

These and other objects of the invention will be apparent from the accompanying drawings and the detailed description of the preferred embodiments.

DETAILED DESCRIPTION OF THE PREFERRED EMBODIMENTS

Figure 2:
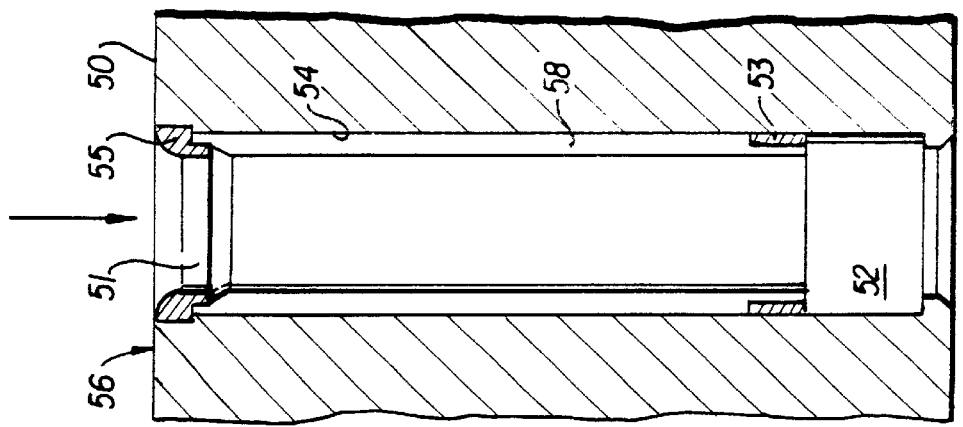
FIG. 2 is a schematic, side view of a portion of an improved die (in section) according to the present invention, having a liner of a low friction material, such as PTFE, which prevents the extrudible material from contacting the material of the die.

Pasta is prepared by shaping an "alimentary paste" or dough, by which is meant a glutinous flour and water mixture. Alimentary paste or dough are generally made from coarse, hard flour obtained from hard wheat, such as the middlings of durum wheat, often referred to as "semolina flour" or, simply, "semolina." In addition, fine flours such as durum flour, where 98 wt % passes through a 70 mesh sieve, are also suitable and are intended to fall within the scope of the term "glutinous flour." However, by no means is the invention limited to flours made from wheat, as the invention has general applicability to any farinacious material, including flours made from other grains, such as oats, corn, buckwheat, etc., seeds such as amaranth, tubers such as cassava, and materials such as rice. The only requirement for the flour is that it provide a self-supporting paste.

By way of illustration only, a typical alimentary paste used to prepare pasta suitable for use in the present invention comprises, based on the weight of uncooked pasta, between about 67% and about 80% by weight (solids basis) of semolina flour (having an inherent moisture content of between about 10 and about 15% and a gluten content of between about 11 and about 14% by weight), the balance being optional additives and added water. Optional additives may include salt, such as sodium chloride, gum, such as propylene glycol alginate (PGA) in amounts from about 0.1 to 2% by weight and other additives known in the pasta art. For example, protein may be added, such as eggs, which may serve to enhance resistance to starch leaching and which may improve the texture and/or flavor of the desired product, e.g., such as when egg noodles are desired. Such added proteins include, but not limited to, albumin, whole egg, egg white, egg yolk, whey protein concentrate, and mixtures thereof.

In addition, materials which are typically added to enrich food products, e.g., B vitamins may be included.

The flour, water and any additives may be mixed in any way conventional in the art to form a dough at which time such pasta dough is ready for extrusion in any of the conventional pasta shapes. Alternatively, the components of the paste may be separately introduced into an extruder comprising a barrel and rotatable screw therein without prior mixing.

Shaped pasta is prepared from the paste by extrusion. Extrusion can be performed with any acceptable extruder whose die has been modified in accordance with the invention. Such alimentary paste is fed into the extruder wherein it may, optionally, be blended, in the case of a screw-type extruder, or further blended if the feedstock was premixed before being fed into the extruder, and then forced by internal pressure through the holes of an extruder that is equipped with a die plate having a plurality of holes to obtain the desired shape.

The holes of the die plate prescribe a profile of the extruded pasta shape. Such shapes include, but are not limited, to spaghetti, fettuccine, linguini, rotini, elbows, spirals, shells, ziti, vermicelli, fusilli, tortellini, ravioli, manicotti, lasagna, rote, tortiglioni, or the like. The alimentary paste may pass through the die plate due to the internal pressure generated by rotating screw (or screws). Suitable screw speeds can be varies over a wide range, e.g., 3.5 to 14 revolutions per minute and optimization of the extrusion rates appear to be correlated to the size and number of openings in the die plate, screw speed, etc.

Figure 1:
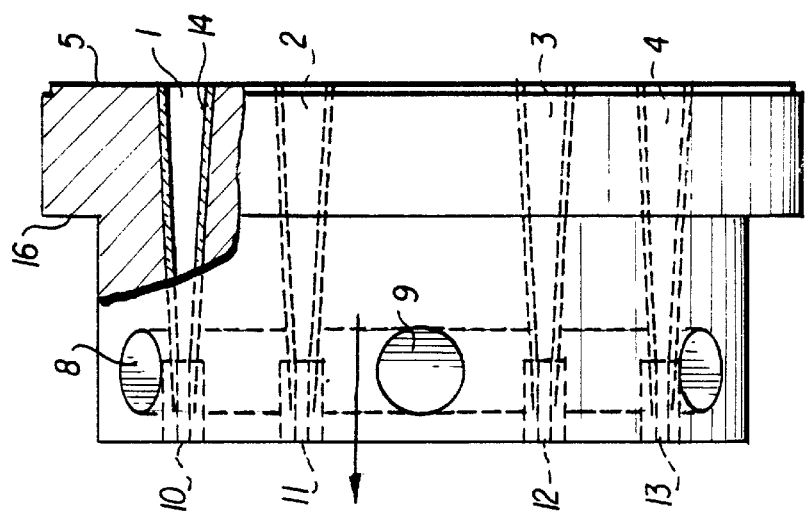
FIG. 1 (prior art) is a schematic, side view, in section which illustrates a die according to the teachings of U.S. Pat. No. 5,089,284.

In accordance with the teachings of the prior art, such as U.S. Pat. No. 5,089,284, die plates were provided which were heated, such as that shown in FIG. 1 (prior art). An alimentary paste would pass through die orifices 1–4 of progressively decreasing diameter of the orifices in the direction of extrusion (see arrow), during which time the alimentary paste was exposed to heat supplied by core heaters 8, 9, heated by resistance heaters (not shown). Numerals 10–13 indicate the end portions of orifices 1–4, respectively, showing that the diameter of the orifices decreases in the direction of extrusion. Collar 16 secures the die body 5 to the extruder. As shown at 14, a portion of the holes of the die orifice are lined with a stick-resistant surface, having a low coefficient of friction and low thermal conductivity, e.g., a coating material selected from polyvinylidine fluoride and polytetrafluoroethylene. The coating on the portion of the orifices serves to substantially inhibit heat transfer to the paste being extruded until the cross-section of the hole reaches its smallest value, e.g., by coating all but about the last 10 to 25% of the length of the orifices.

However, this means that the alimentary paste will be able to contact the surfaces of the die in these uncoated portions as it reaches the smaller cross section of the orifice.

Applicants have found that this contact undesirably affects the properties of the resulting extruded pasta, resulting in such detriments as poor surface smoothness, increased loss of starch on cooking and reduced organoleptic properties.

In addition, the manufacture of such dies having converging orifice walls, is very expensive. In addition, the provision of uniform coatings of a material on the internal wall surfaces is very difficult to achieve in practicality.

Therefore, according to the invention, as shown in FIG. 2, a die body 50 (shown in part sectional view) is provided with one or more orifices 51, defined by the wall 54, within die body 50. Orifice 51 can be of any shape, but its cross section is preferably made of a simple geometric shape, e.g., circular, so as to be easily machined within die body 50. It is to be understood that there may be many more orifices 51 arranged within die body 50, depending on the size of die body 50 and the shape and size of the orifices themselves. Within orifice 51 is placed an insert 52. In the present instance, it is preferably if insert 52 comprises a low friction material such as PTFE. To hold insert 52 in place, metal ring 53 is provided to maintain insert 52 in place. Extending from insert 52 and integral therewith, is an elongated tube 58, preferably of PTFE. To locate tube 58 within orifice 51, a ring 55, also of PTFE, is placed within orifice 51 so as to locate the PTFE insert within the orifice. Extrusion of the extrudable material is in the direction of the arrow shown in FIG. 2.

In a still further embodiment of the invention, the upper (rear) surface 56 of die body 50 is provided with a PTFE coating, such that the extrudible material contacting rear surface 56 of die body 50 will experience low friction and reduced shear as it moves along surface 56 into at least one orifice 51. Die body 50 may be provided with conventional means (not shown) so as to mount die body 50 at the end of an extrusion machine.

As noted above, extrusion machines typically comprise an extruder barrel, one or more rotating screws within said barrel and terminating in a die having one or more orifices therein. It is also typical in such extruders to provide at least one screen and/or breaker plate (preferably made of a metal or metal alloy), the purpose of which is to prevent oversized aglomerated materials or non-homogenous components from passing into orifice 51 in die body 50. When such components, i.e., the at least one screen and/or breaker plate, are utilized in a pasta extrusion process according to the present invention, it is preferable that such screens and/or breaker plate are also completely coated with a low friction material such as PTFE. It has been found that the coating of such components reduces the shear to which the alimentary paste is subjected, thereby improving the properties of the resulting extruded pasta.

Such improvement in properties include the production of a non-sticky pasta with minimal loss of solids during cooking. The pasta produced also had a better surface smoothness and color (yellowness and brightness) than one produced by a die provided with no, or only partial, PTFE lining.

Having fully disclosed the invention, it will be evident to those of ordinary skill in the art that many modifications can be made without departing from the spirit and scope of the invention.

We claim:

1. In a process for manufacturing pasta having a smooth surface, said process comprising:
    (a) forming an alimentary paste comprising flour and water;
    (b) forcing said alimentary paste through flow channels in a die to form said pasta, the improvement comprising:
    reducing the shear to which the alimentary paste is subjected to during the step of forcing said alimentary paste through said die, by lining 100% of the flow path of said channels through the die with a low friction material.

2. The process of claim 1, wherein the low friction material is polytetrafluoroethylene.

3. The process of claim 1, including the step of blending the alimentary paste in the barrel of an extruder having a rotating screw therein.

4. The process of claim 3, wherein the extruder further comprises a screen and a breaker plate, the process further including covering at least one of said screen and said breaker plate with a low friction material.

5. The process of claim 4, including covering both said screen and said breaker plate with a low friction material.

6. The process of claim 1, wherein the lining of said flow path is performed by placing inserts of said low friction material in the flow path of said die.

7. The process of claim 1, further comprising the step of covering a back surface of the die with a low friction material.

8. Pasta produced by the process of claim 1.

9. Pasta produced by the process of claim 4.

10. Pasta produced by the process of claim 7.

11. A die for an extrusion process, said die comprising a die body defining a plurality of flow paths therethrough, said flow paths extending from a back side of said die body to an orifice side of said die body, said flow paths of said die body being 100% lined with a low friction material.

12. The die of claim 11, wherein said back of said die body is also covered with a low friction material.

13. The die of claim 11, wherein said lining of low friction material comprises a tube of low friction material placed within said die body.

14. The die of claim 13, further comprising a ring of low friction material placed so as to locate said tube with said flow path.

15. An extruder comprising a barrel with at least one rotating screw therein, a die body located at an output end of said extruder, said die body defining a plurality of flow paths from a rear surface of the die body through outlet orifice, a breaker plate and screen located between a downstream end of said screw and said die body; at least the flow paths through the die body being 100% lined with a low friction material.

16. The extruder of claim 15, wherein the rear surface of the die body is coated with a low friction material.

17. The extruder of claim 15, wherein at least one of such breaker plate and said screen are covered with a low friction material.

18. The extruder of claim 15, wherein both said breaker plate and screen are covered with said low friction material.

19. The extruder of claim 15, wherein said flow paths are of simple geometric shape.

20. The extruder of claim 19, wherein said simple geometric shape is defined by a circular cross section.

* * * * *